Oct. 26, 1943.  H. J. HOLTZCLAW  2,332,514
INKING-IN ROLLER
Filed Dec. 28, 1940
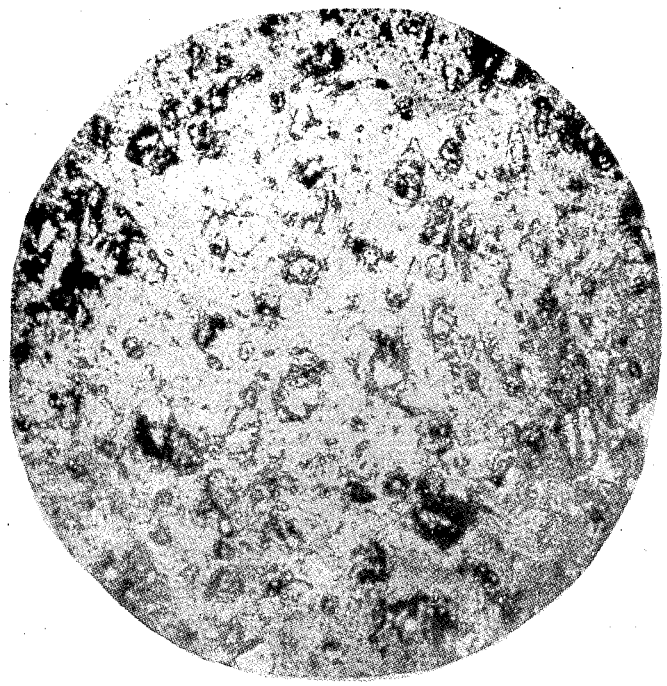
HENRY J. HOLTZCLAW
INVENTOR
By
ATTORNEY Patented Oct. 26, 1943

2,332,514

UNITED STATES PATENT OFFICE 2,332,514

INKING-IN ROLLER

Henry J. Holtzclaw, Silver Spring, Md.

Application December 28, 1940, Serial No. 372,203

1 Claim. (Cl. 91—67.8)

(Granted under the act of March 3, 1883, as amended April 30, 1928; 370 O. G. 757)

This application is made under the act approved March 3, 1883 (ch. 143, 22 Stat. L. 625), as amended by the act of April 30, 1928 (ch. 460, 45 Stat. L. 467), and the invention herein described, if patented, may be manufactured and used by or for Governmental purposes without the payment to me of any royalty thereon.

This invention relates to inking-in rollers, and aims generally to improve the same.

The invention is particularly, but not exclusively, applicable to rollers for inking-in intaglio printing plates, and has as a major object the provision of a roller formed of a rubber or synthetic rubber compound having a surface cell structure to hold and transfer ink in quantities ample to fill intaglio grooves of considerable depth.

Other and further objects of the invention, severally and collectively, will be apparent from the following detailed description of preferred embodiments thereof.

In the printing of paper money, stamps and other engraving work, the intaglio plates employ grooves of greatly varying ink carrying capacity. In sharp engraving work, for example, some grooves may have a depth of .007" as compared with detail shading grooves which may have a depth in the neighborhood of .0005".

The experience of many years has shown that an ordinary solid rubber or synthetic rubber inking-in roller will transfer to the surface of such a plate a film of the usual ink composition having a depth of only about .0003", resulting in failure to fill many of the larger grooves, and particularly V-shaped grooves of a depth in the neighborhood of .007".

The present invention aims to obviate such difficulty by providing an adequately firm, substantial, inking-in roller, having ink-holding voids, in its surface of controlled size and distribution for insuring the transfer of sufficient ink to fill the entire range of grooves concerned.

To this end the invention contemplates the incorporation, in the roller material, of particulate or filamentaceous matter which may be removed without damage to the roller composition to leave in the roller surface suitable ink-retaining cells or voids, such material preferably being incorporated throughout at least the entire surfaceable depth of the roller so that the voids will be discernible and prevalent when the diameter of the roller has been reduced by wear or by grinding or re-grinding to a true cylindrical surface.

In the preferred embodiment the void-forming material may be a soluble material not interfering with the manufacture of the roller, and capable of being etched or dissolved from the roller surface by a suitable chemical or physical solvent of a character not detrimental to the rubber or synthetic rubber roller composition.

The figure of the drawing shows a photomicrograph of an area of the roller surface forming the subject matter of the invention.

For example, in the manufacture of an inking-in roller of, say, six and one-half inch initial diameter, the surfaceable rubber or synthetic rubber body may have a thickness of, say, one to one and one-half inches, and may be applied to a suitable core element, which may take the form of a mandrel, a four-inch iron pipe having end-discs welded or otherwise secured in it and bored to receive adapter plugs or the like to facilitate mounting it on the roller shaft of a press, or any other form of carrier. The securing of the roller body to the core element may be effected in any of the known ways, as by vulcanization to the metal, for example.

In making up the roller composition in accordance with this invention, in order to obtain complete control of the size and distribution of the void forming matter, a fine-grained material which will not produce any steam or gas at vulcanization temperature, should be employed. As the rollers are to be used with greasy inks, the particulate material should be substantially dry and non-hygroscopic to insure that no part of the roller surface will be rendered ink-repellant. Furthermore, as particulate material will be exposed in the surface of the roller by wear, the particulate material, as well as the body of the roller, should have a hardness lower than that of the printing-plate surface. For example, in the scale of hardness in which the diamond is 10, chromium about 9, and barytes (a constituent of the usual intaglio printing ink) about 3 to 4, it is desirable that the hardness of the roller and its particulate material be considerably less than 9, if the intaglio surface is chromium-plated, for example, and preferably even less than the hardness of the barytes.

In addition it is desirable that the roller be so formed that there will be no embedded voids communicating with the surface voids or cells, because the presence of intercommunicating voids within the roller body would cause the roller to absorb ink, rendering it difficult, if not impossible, to satisfactorily clean the roller for use with another color ink. This factor, plus the necessity to control the size and distribution of the voids during, as well as before, the vulcanizing operation, militates against forming the roller body of gas-celled sponge rubber, for example.

Accordingly, the present invention contemplates the employment of a well-dried particulate material, not deleteriously hygroscopic, not of such hardness as to scratch or unduly abrade the printing plate, of a fineness in the neighborhood of 100 mesh, adapted to be well dispersed in the roller composition, to produce a multiplicity of discrete particle-occupied cells of which those on the surface can be voided by transpiration of their particles therefrom and of which those removed from the surface are prevented from receiving and retaining ink, both by the presence of the particles therein and by the fact of the substantial absence of any net-work of communicating voids.

While from the above teaching other substances can probably be selected having the desired characteristics, it has been found that fine-grained dried crystalline particles of sodium chloride are sufficiently non-hygroscopic, have a hardness of only about 4 to 5 on the above-mentioned scale, can be obtained with a suitable fineness of about 100 mesh, disperse well in the rubber or synthetic rubber, have, on transpiration from the roller surface into the ink, no deleterious effect on the life of the roller, on the ink, or on the printing plate or work, do not interfere with the bonding of the composition to the core, and easily transpire from the surface to produce the desired voids therein. By effecting thorough drying of the particles it is possible to obviate their adherence or caking, and to insure their discrete distribution in the composition.

A particularly satisfactory embodiment of the invention may be achieved by thoroughly mixing and dispersing uniformly throughout the rubber-like roller composition a considerable quantity, but preferably not more than 50% and in the neighborhood of 30% by weight, (i. e., corresponding to about 10% to 15% by volume) of thoroughly dried particles of sodium chloride fairly uniformly of about the above indicated fineness. After very thorough mixing the composition can be molded on the core, vulcanized and cured in the usual manner, the vulcanizing temperature, say about 285°, having no deleterious effect on the salt particles.

Following the vulcanizing and curing or aging steps, the roller is treated by grinding it down to a true cylindrical surface, and by removing the particles of salt from the active surface thus formed on the roller. On grinding or re-grinding the surface of a roller formed in this manner, most of the surface salt drops out, and the remainder may be washed from the surface of the roller with warm water, leaving a roller surface fairly uniformly covered with a multitude of closely spaced tiny cell-like voids adapted to retain the ordinary printing ink, of the type used in intaglio printing, in sufficient quantity to insure filling even the relatively wide and deep grooves employed in printing plates for sharp-engraving work.

The accompanying illustration is a photomicrograph of a circular area a little under ¼-inch in diameter of a roller surface formed in the manner just described. The crystalline particles of salt embedded in the amorphous rubber body, and the voids in said body left by the dropping out of salt particles, are easily observable by inspection, as is their even distribution throughout the body.

Following the extraction of the particulate material from the exposed surface, either after the initial or any re-grinding, the roller will, of course, be thoroughly dried so that its surface will retain no water apt to render any portion of it ink-repellant.

It will further be apparent that the present invention, in its preferred embodiments, provides a roller in which the particulate material completely embedded in the body of the composition contributes to adequate firmness of the roller, and yet provides for the formation of the improved transferring surface on each re-grinding of the roller.

As rollers in which the invention may be embodied may be of relatively large diameter, the life of such rollers may be extended for many years by re-grinding, and each re-grinding yields a surface having the desired improved ink-transferring characteristic.

Having described preferred embodiments illustrative, but not restrictive of my invention, I claim:

A self-renewing inking-in roller for intaglio printing surfaced with a cylindrically abraded body of roller composition having embedded in its structure a uniform distribution of discrete well dried particles of crystalline sodium chloride, said particles being of a fineness of about 100 mesh and forming by transpiration from the surface of the roller, when said roller is abraded initially and by wear, a multiplicity of tiny discrete ink-transporting pits or cells, said sodium chloride particles, when transpiring into the printing ink, being by virtue of their fineness and relative softness, without noticeable effect on the printing plate and work, and said particles, by virtue of their discrete distribution and dryness, obviating any network of communicating voids in, and any greasy ink repellance of, the roller.

HENRY J. HOLTZCLAW.